US012789440B2

(12) United States Patent
Giacobbe

(10) Patent No.: US 12,789,440 B2
(45) Date of Patent: Nov. 10, 2026

(54) DIE GROUP OF TUBULAR PARISON FORMING HEADS WITH MEANS FOR ADJUSTING CENTRING OF THE DIE AXIS

(71) Applicant: MAGIC MP S.P.A., Carate Brianza (IT)

(72) Inventor: Ferruccio Giacobbe, Carate Brianza (IT)

(73) Assignee: MAGIC MP S.P.A., Carate Brianza (IT)

( * ) Notice: Subject to any disclaimer, the term of this patent is extended or adjusted under 35 U.S.C. 154(b) by 49 days.

(21) Appl. No.: 19/101,709

(22) PCT Filed: Sep. 11, 2023

(86) PCT No.: PCT/IB2023/058994
§ 371 (c)(1),
(2) Date: Feb. 6, 2025

(87) PCT Pub. No.: WO2024/057181
PCT Pub. Date: Mar. 21, 2024

(65) Prior Publication Data

US 2026/0048542 A1 Feb. 19, 2026

(30) Foreign Application Priority Data

Sep. 13, 2022 (IT) ........................ 102022000018741

(51) Int. Cl.
*B29C 49/42* (2006.01)
*B29C 49/04* (2006.01)

(52) U.S. Cl.
CPC .... *B29C 49/04116* (2022.05); *B29C 49/0411* (2022.05); *B29C 49/42362* (2022.05); *B29C 49/42374* (2022.05)

(58) Field of Classification Search
None
See application file for complete search history.

(56) References Cited

U.S. PATENT DOCUMENTS 5,286,183 A * 2/1994 Tonsi .................... B29C 48/327 425/141
9,713,895 B2 * 7/2017 Feuerherm .............. B29C 49/04
2022/0332032 A1 * 10/2022 Brandau ................. B29C 49/48

* cited by examiner

*Primary Examiner* — Thu Khanh T. Nguyen

(57) ABSTRACT

A die group with a forming head for forming a tubular parison made of plastic material with a female die, which defines an internal through-cavity with a vertical die axis, a female die holder element, rigidly connected to the female die, and a housing body which defines a vertical reference axis for coupling with a distribution duct of the forming head and supports the female die holder element allowing relative movement thereof in a longitudinal/transverse plane. A first electric driving actuator is supported on the housing body and rotationally drives a first output element coupled with the female die holder element by means of a first transmission mechanism so as to move the female die holder element in the longitudinal/transverse plane with respect to the housing body, in accordance with a first isometric transformation.

14 Claims, 6 Drawing Sheets

Figure 8:
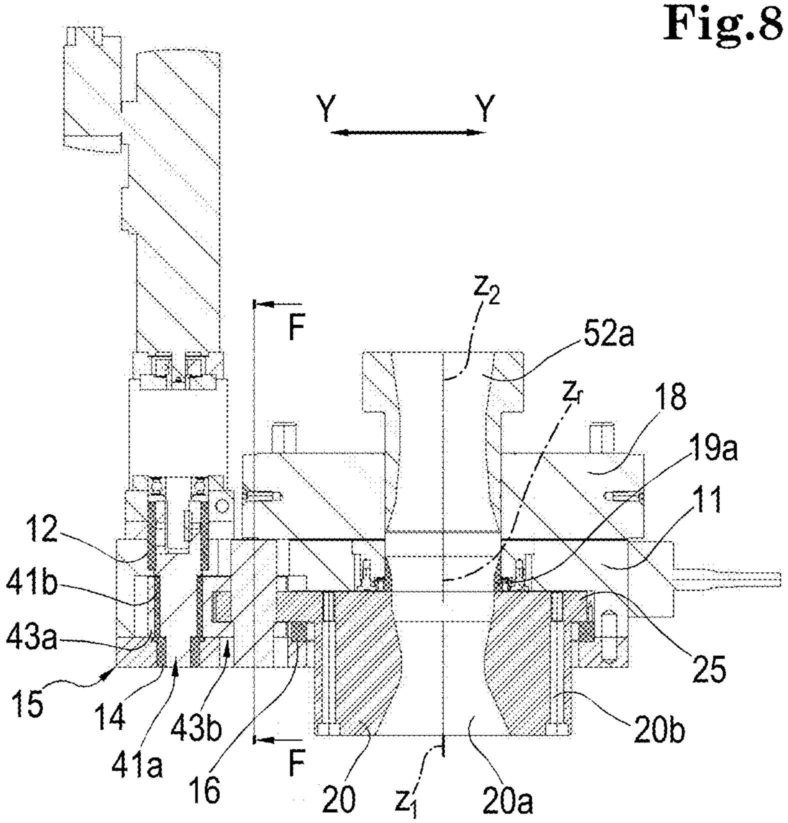

Fig.1
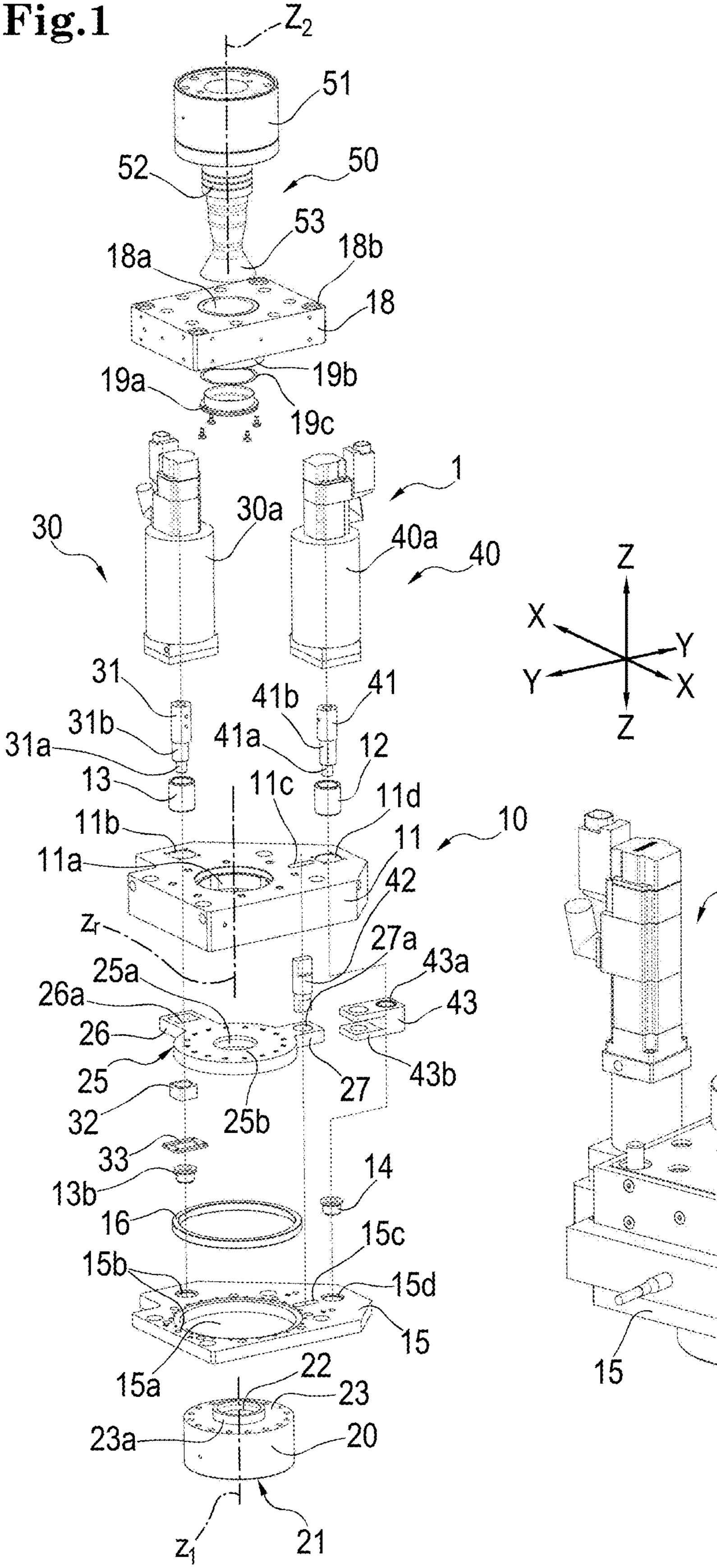
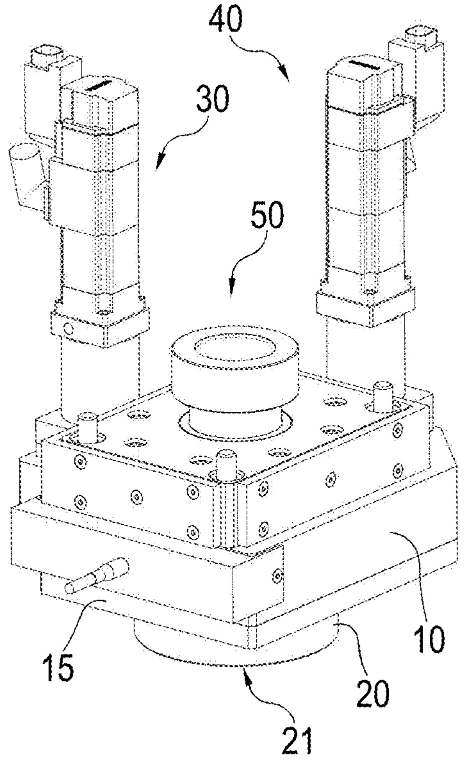
Fig.2

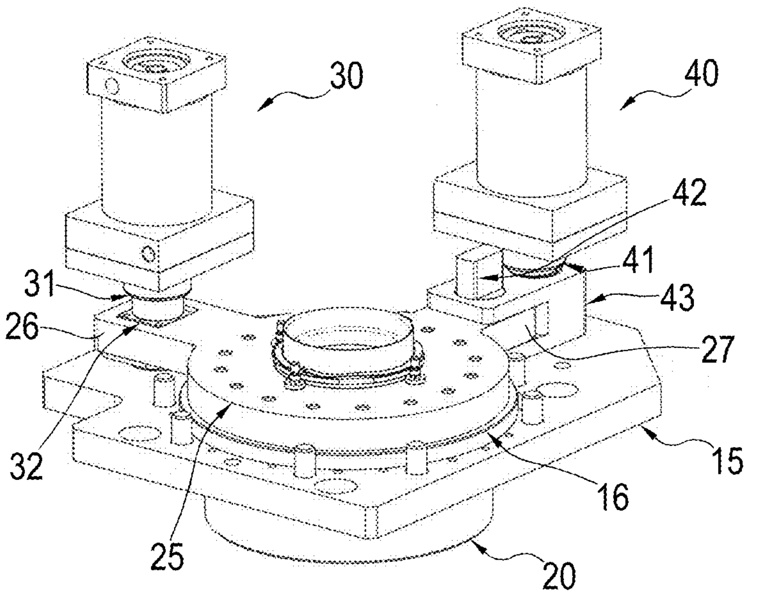
Fig.3
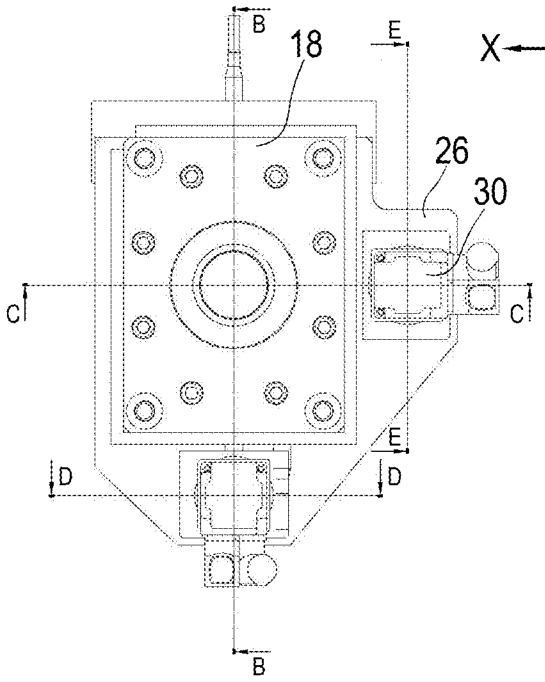
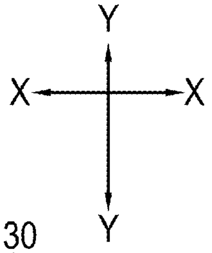
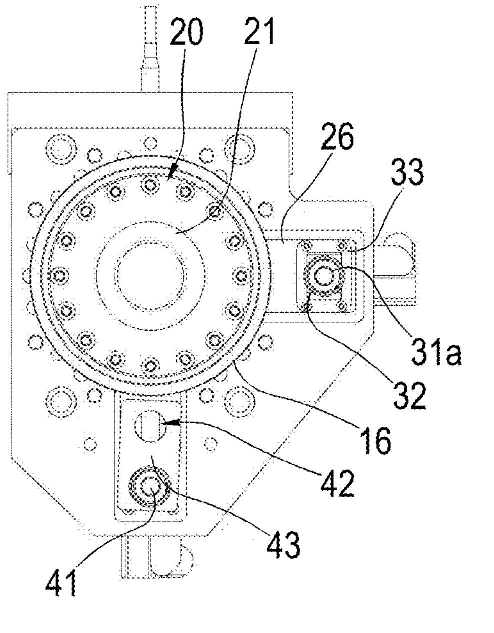
Fig.4 Fig.5

Fig.6
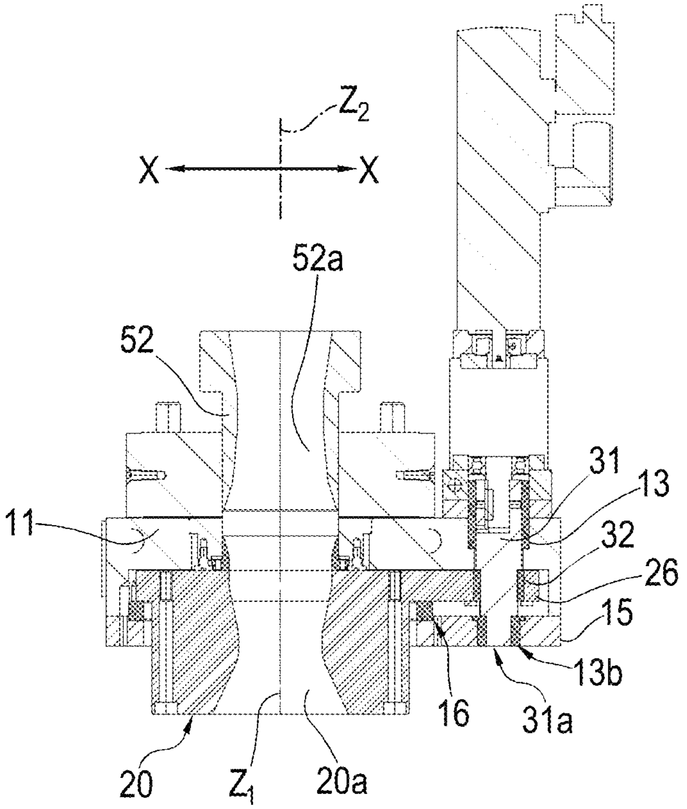
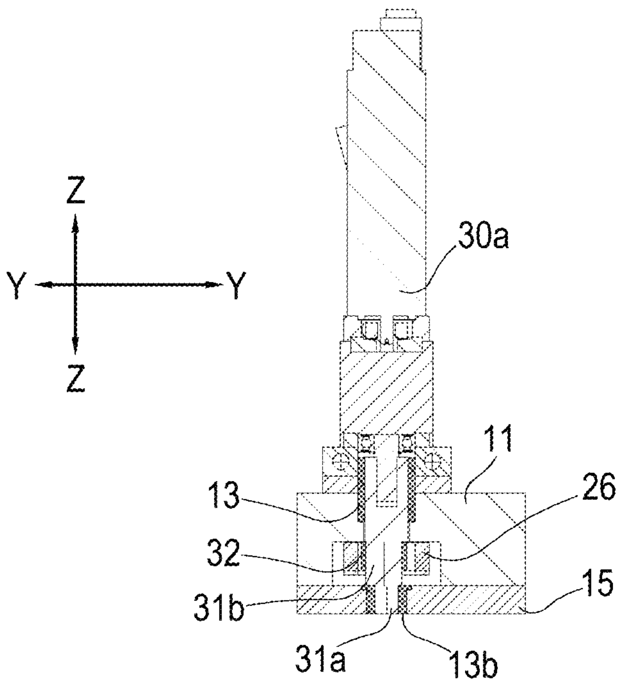
Fig.7

DIE GROUP OF TUBULAR PARISON FORMING HEADS WITH MEANS FOR ADJUSTING CENTRING OF THE DIE AXIS

The present invention relates to a die group for a forming head for forming tubular parisons made of plastic material and a tubular parison forming head provided with such a die group.

In the technical sector of packaging liquid products and the like, it is known that there exists the need to produce plastic material containers suitable for this purpose.

It is also known that said containers are formed in suitable blow-moulding machines provided with forming heads which are designed to dispense through a bottom dispensing mouth a respective tube of extruded plastic material—known as a "parison"—along a vertical dispensing axis.

Each forming head is arranged above an associated blowing seat of a blowing mould, formed by two half-moulds displaceable between two different opening/closing positions for capturing/releasing the dispensed parisons which are blown inside the closed mould.

It is also known that each parison forming head comprises a supply group with a vertical-axis distribution chamber which supplies the plastic material to the bottom dispensing mouth.

The dispensing mouth is in turn formed by a female die which has, coaxially inserted inside it, an elongated male element with a vertical axis so that, by varying the relative position in the vertical direction between the female die and the male element, it is possible to adjust the opening of the dispensing mouth and therefore the thickness profile of the parison being dispensed.

The coupling between the female die and the male element is therefore generally such as to allow a relative displacement of the female die and the male element in the vertical direction so as to perform said adjustment of the thickness of the parison.

In this context, it is known that the female die is typically formed by a generally cylindrical matrix with an internal vertical-axis cavity which is coupled with the distribution duct of the supply group and with the male element so as to be coaxial with the vertical axis of the distribution chamber, with the axis of the male element and therefore with the dispensing axis of the forming head.

It is therefore of fundamental importance to couple the die with the forming group correctly centred so as to ensure perfect coaxial alignment between the vertical axis of the head and the vertical die axis.

Incorrect centring of the die with respect to the dispensing axis of the forming head in fact results in undesirable imperfections in the dispensed parison and therefore in the blown plastic container.

It is however known that the centring of the die is not always ideal for obtaining the maximum quality of the parison, in particular owing to imprecisions in the mechanical machining of the various component parts which are not perfectly centred during assembly.

In addition, it may happen that, during forming of the parisons, the material flows in a non-uniform manner through the dispensing mouth and it therefore becomes necessary to move the die in order to compensate for the non-uniform distribution.

Manual systems for adjusting the centring of the die are known, these however require complicated manual adjustments with stoppage of the machine and are subject to human error during the fine adjustment.

Example of solutions according to the prior art are described and illustrated into EP 0873 845 B1, EP 3 078 477 B1, US 2005/276876 A1, DE 195 37 132 C2.

The technical problem which is posed therefore is that of providing a die group for parison forming heads of blow-moulding machines which solves or at least partially overcomes the said problems of the prior art.

A particular object of the present invention is to obtain a precise centring of the female die with respect to the vertical dispensing axis of the forming head, which can be easily and rapidly adjusted.

These results are obtained according to the present invention by a die group for a forming head for forming a tubular parison made of plastic material according to the features of claim 1.

The die group therefore comprises a female die, which defines an internal through-cavity with a vertical die axis; a female die holder element, rigidly connected to the female die; a housing body which has an upper through-hole which defines a vertical reference axis for coupling with a distribution duct of the forming head, said housing body arranged and configured to support the female die holder element allowing relative movement thereof in a longitudinal/transverse plane orthogonal to the vertical reference axis and parallel to a longitudinal direction and to a transverse direction orthogonal to each other and to the vertical reference axis; a first electric driving actuator, supported on the housing body and configured to rotationally drive a first output element, the first output element being coupled with the housing body and with the female die holder element by means of a first transmission mechanism such that the rotational movement of the output element moves the female die holder element in the longitudinal/transverse plane with respect to the housing body, in accordance with a first isometric transformation; a second electric driving actuator, supported on the housing body and designed to rotationally drive a second output element which is coupled with the housing body and with the female die holder element by means of a second transmission mechanism, such that rotational movement of the output element moves the female die holder element in the longitudinal/transverse plane with respect to the housing body, in accordance with a second isometric transformation.

In this way rotational driving of the first output element and/or the second output element by means of the respective first or second electric actuator easily and precisely adjusts the position of the vertical die axis with respect to the vertical reference axis in the longitudinal/transverse plane, and therefore the centring of the die with respect to the distribution duct of the forming head.

Preferred embodiments are described in the dependent claims which are fully cited herein.

The present invention relates furthermore to a forming head for forming a tubular parison according to Claim 13, which also allows precise adjustment of the thickness profile of the dispensed parison.

Figure 9:
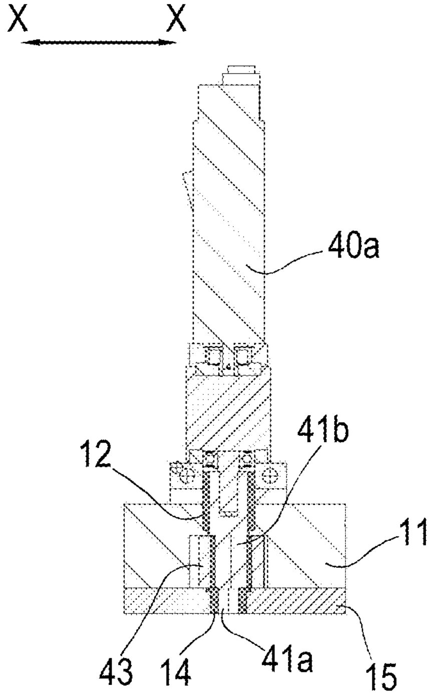
Figure 10:
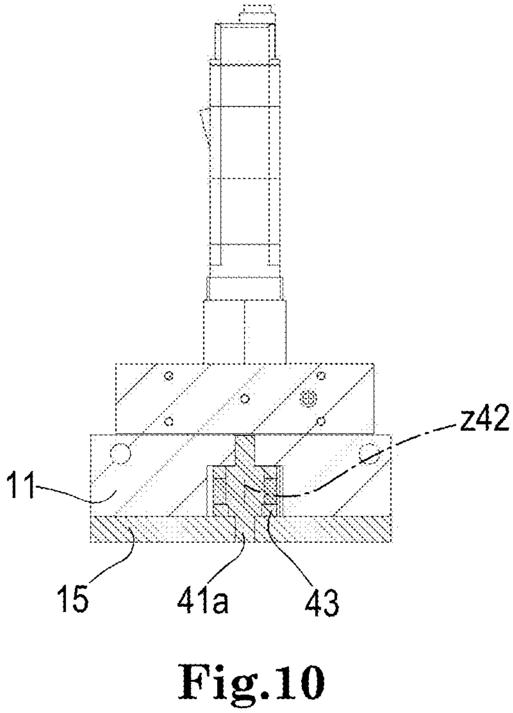
Figure 11:
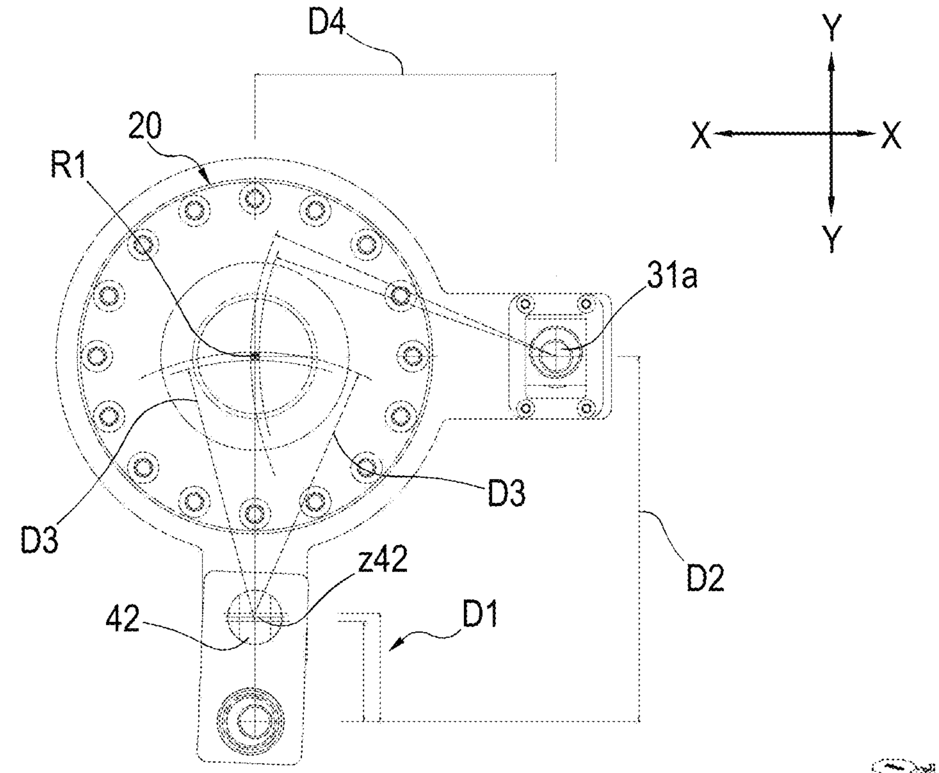
Figure 12:
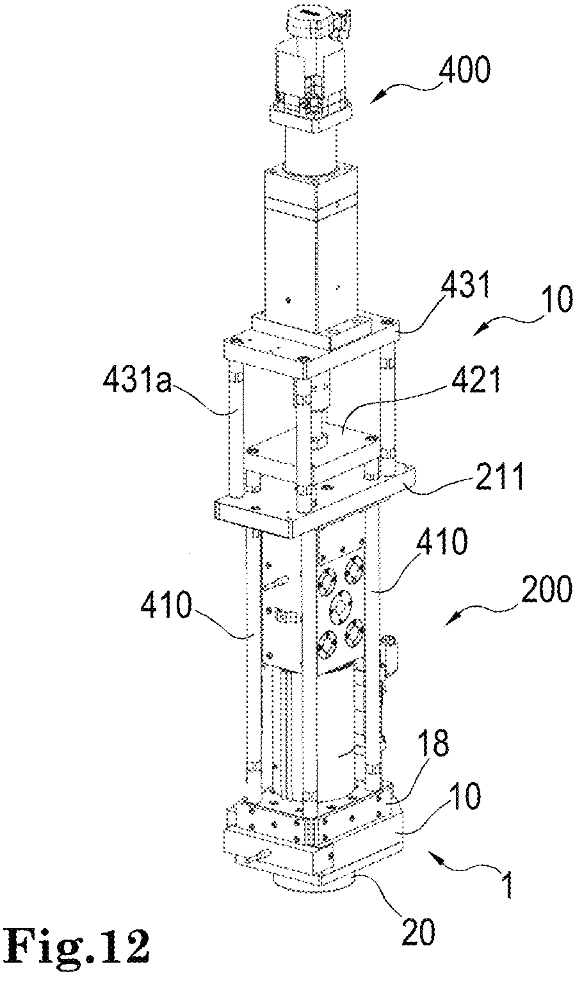
Figure 13:
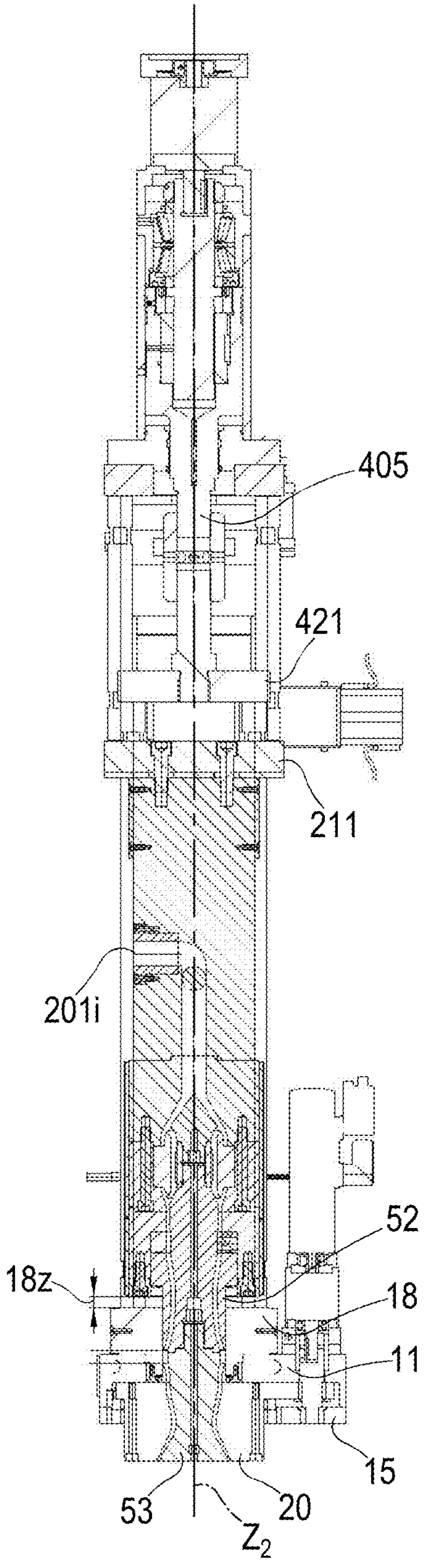
Figure 14:
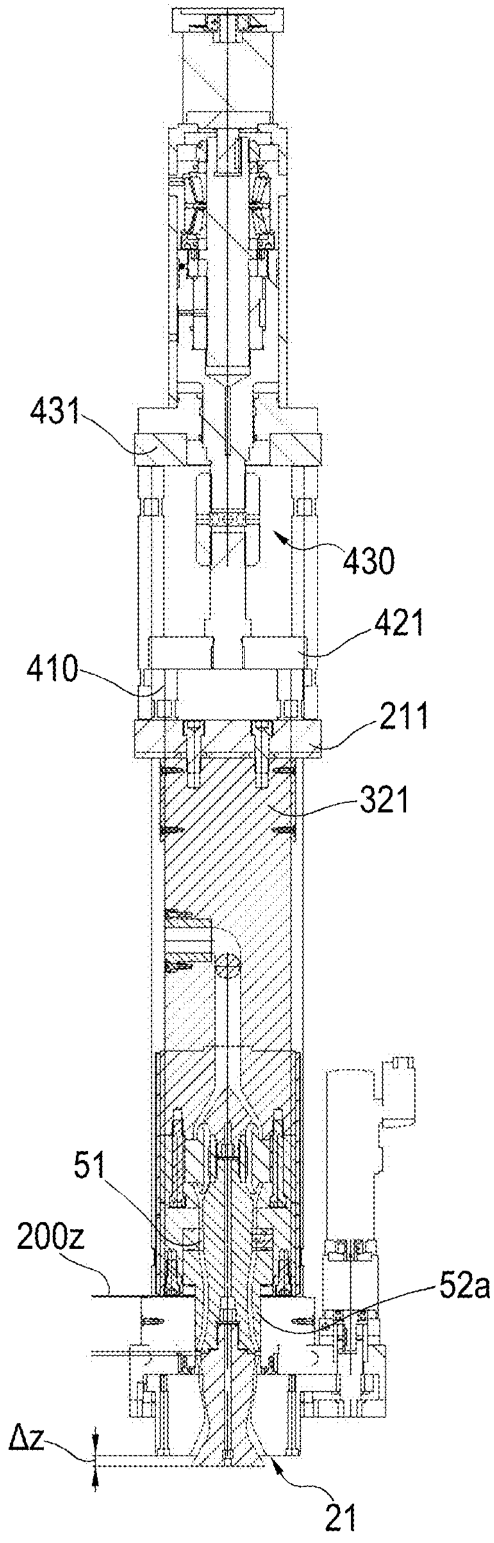

Further details may be obtained from the following description of a non-limiting example of embodiment of the subject of the present invention provided with reference to the attached drawings in which:

FIG. 1: is a schematic, perspective, exploded view of a die group according to the present invention, situated underneath the end part of a distribution chamber of the forming head and a male element, designed to be coupled to the female element;

FIG. 2: is a perspective view of the die group according to FIG. 1 in the assembled condition, with an end distribution duct coaxially inserted inside the die group;

FIG. 3: shows a perspective view of the group according to FIG. 2 in the partially assembled condition;

FIG. 4: shows an isometric view, from above, of the die group according to FIG. 2;

FIG. 5: shows an isometric view, from below, of the die group according to FIG. 4, with the bottom closing plate removed;

FIG. 6: shows a schematic cross-sectional view along a vertical plane passing along the cross-sectional line C-C of FIG. 4;

FIG. 7: shows a schematic cross-sectional view along a vertical plane passing along the cross-sectional line E-E of FIG. 4;

FIG. 8: shows a schematic cross-sectional view along a vertical plane passing along the cross-sectional line B-B of FIG. 4;

FIG. 9: shows a schematic cross-sectional view along a vertical plane passing along the cross-sectional line D-D of FIG. 4;

FIG. 10: shows a schematic cross-sectional view along a vertical plane passing along the cross-sectional line F-F of FIG. 8;

FIG. 11: is an isometric diagram of the movement pattern of the plate and the die axis in the longitudinal transverse plane;

FIG. 12: is a perspective view of a parison forming head with a die group according to the present invention;

FIG. 13: is a schematic cross-sectional view, along a vertical plane, of the head according to FIG. 12, in the closed condition of the bottom parison dispensing mouth;

FIG. 14: is a vertically sectioned schematic view of the forming head in the maximum opening condition of the bottom mouth.

Assuming for the sake of easier description and without a limiting meaning a set of three reference axes respectively extending in a vertical direction Z-Z, parallel to a vertical die axis and a vertical dispensing axis of a parison forming head, longitudinal direction X-X widthwise of the die group, orthogonal to the vertical direction Z-Z, and transverse direction Y-Y depthwise of the group and orthogonal to the other two directions, as well as a top part and a bottom part, opposite each other in the vertical direction Z-Z, FIG. 1 schematically shows the bottom end part 50 of a supply group of a parison forming head, which has a distribution chamber 51 which supplies a duct 52*a* (FIG. 6) with a vertical axis z2 of a coupling bush 52, which has, coaxially inserted inside it, a male element 52; according to conventional technology, the bush 52 is designed for coaxial coupling with the die group 1 so that the duct 52*a* is coaxial with the die and that the male element 53, inserted coaxially inside the die group 1, forms therewith a bottom parison dispensing mouth.

With reference to FIGS. 1-5, the depicted preferred example of a die group 1 according to the invention comprises a female die matrix 20, which defines an internal through-cavity 20*a* (FIG. 6) with a vertical central axis z1. The female die 20 may generally be in the form of a cylindrical body 20 with said through-cavity 20*a* extending between a bottom mouth 21 and a top opening 22. The top end of the cylindrical body 20 is, in the example shown, partially closed by an annular plate 23 provided with a coaxial collar 23*a* projecting in the vertical direction towards the top part, so as to define said top opening 22.

A die holder element 25 is rigidly connected to the female die 20. In greater detail, this element is preferably in the form of a plate 25 extending in a longitudinal/transverse plane and with a through-hole 25*a* in the vertical direction Z-Z.

In the preferred example shown, the plate 25 comprises: an annular plate 25*b*, which has, arranged at the centre thereof, said through-hole 25*a*, a first radial extension 26 projecting in the longitudinal direction X-X and a second radial extension 27 projecting in the transverse direction Y-Y.

The first radial extension 26 comprises a rectangular hole 26*a* passing through in the vertical direction. The second radial extension 27 has a circular hole 27*a* with a vertical axis.

The plate 25 is designed to be coaxially coupled with the female die 20 by inserting the collar 23*a* inside the through-hole 25*a* of the plate until it makes contact with the annular plate 25*b* and the upper surface 23 of the female die 20; the plate 25 may then be fastened to the female die matrix 20 by means of fixing means such as screws 20*b* (FIG. 8) passing in the vertical direction through corresponding holes in the annular plate 23 of the die 20 and designed to engage inside respective female-thread holes of the plate 25.

As will emerge more clearly below, once coupled together, the die 20 and the die holder element 25 are designed to move integrally in a longitudinal/transverse plane parallel to the longitudinal direction and transverse direction.

A housing body 10 is arranged and configured to support the die holder element 25, allowing the relative movement thereof in the longitudinal/transverse plane X-Y.

In particular, the housing body 10 may comprise an upper casing 11 and a lower closing plate 15 which are designed to be fastened together to define an internal housing volume for the die holder plate 25.

The bottom closing plate 15 has a vertical-axis through-hole 15*a* with a diameter greater than the outer diameter of the die matrix 20 such as to allow the coaxial insertion of the said matrix inside the hole 15*a* with the possibility of moving in the longitudinal and transverse direction. The upper surface of the plate 15 has, formed therein, a recessed annular seat 15*b* which surrounds the through-hole 15*a* and is designed to house a sliding friction ring 16 which facilitates the sliding movement of the plate 25 on the closing plate 15.

The plate 15 also has a circular hole 15*b* passing through in the vertical direction and arranged opposite the rectangular hole 26*a* of the longitudinal extension 26 of the plate 25 and a through-slot 15*c* extending in the transverse direction Y-Y in correspondence of the transverse extension 27 of the plate 25. A vertical-axis through-hole 15*d* aligned in the transverse direction with the through-slot 15*c* is also arranged in an external position in the transverse direction Y-Y of the through-slot 15*c*.

The casing 11 of the housing body has an upper plate with a form generally corresponding to that of the lower plate 15, and perimetral vertical walls which define the housing volume.

The upper plate of the casing has a vertical-axis through-hole 11*a*, with a diameter smaller than the diameter of the hole 15*a* in the closing plate 15 with which it is preferably coaxial.

A sealing assembly is inserted in the bottom end of the hole 11*a* and configured to maintain the seal between the female die holder plate 25 and upper plate of the casing 11, when there is a variation in their relative position. For example, the sealing assembly may include a lower bush 19*a* in contact with the plate 25, an upper bush 19*b* fixed to the housing body 10 and pressing means 19*c* arranged between the two bushes so as to maintain the seal between the lower bush 19*a* and the plate 25 (FIGS. 3,8). The housing body 10 also comprises an upper block 18 for coupling with the forming head, which has a central hole 18*a* with a vertical axis zr. The block 18 is designed to be rigidly fixed to the upper plate of the casing 11, for example using fixing screws (not shown), so that the axes of the hole 18*a* and the hole 11*a* coincide, forming an upper hole 18*a*, 11*a* in the housing body 10. The coupling block 18 and upper plate 11 could also be formed as one piece, but the two-piece configuration is easier to assemble.

The hole 18*a* and/or the hole 11*a* has/have dimensions such as to allow the coaxial insertion (FIGS. 2, 6-8) of the coupling bush 52 which has inside it the male element 50 (not shown in FIGS. 6-8).

The upper hole 18*a*, 11*a* therefore defines a vertical reference axis zr for coupling the die group 1 with the forming head which, once coupling has been performed, will coincide with the axis z2 of the duct 52*a* for distributing the material from the supply group to the die 1.

The upper block 18 is also provided with perimetral holes 18*b* for coupling by means of fastening means to a structural part of the forming head, using methods which will be described in greater detail below.

On the upper plate, the casing 11 also has:

- a circular hole 11*b*, passing through in the vertical direction, arranged in correspondence of the rectangular hole 26*a* in the longitudinal radial extension 26 of the plate 25 and coaxial with the hole 15*b* of the closing plate 15;
- a through-slot 11*c*, extending in the transverse direction Y-Y in correspondence of the through-slot 15*c* of the plate 15 and therefore of the transverse radial extension 27 of the plate 25;
- a second, circular, vertical-axis hole 11*d* arranged in an external position in the transverse direction Y-Y with respect to the through-slot 11*c* and coaxially aligned with the through-hole 15*d* of the plate 15.

A first electric driving actuator 30 is mounted on the housing body 10 and has an output element 31 rotationally driven about a respective vertical axis. The output element 31 is coupled to the housing body 10 and to the die holder plate 25 by means of a first transmission mechanism, described in greater detail below, designed to move the plate 25 with respect to the housing 10 in the longitudinal/transverse plane X-Y orthogonal to the vertical reference axis zr.

The electric driving actuator 30 may preferably comprise an electric motor 30*a* with encoder and vertical-axis gearmotor which drives the output element 31, in particular consisting of a vertical shaft 31 with an eccentric pin 31*b*. The bottom end 31*a* of the eccentric shaft 31, in the example shown, is provided with a coaxial pin 31 coaxial with the vertical axis of the shaft 31.

The shaft 31 is inserted through a bush 13 fixed inside the hole 11*b* of the casing 11.

The eccentric pin 31*b* of the shaft 31 is housed inside the through-hole of a parallelepiped lining block 32 which has external dimensions with a transverse dimension smaller than the transverse dimension of the rectangular hole 26*a* of the plate 25.

The lining block 32 is housed inside the rectangular hole 26*a* of the die holder plate 25. The lining block 32 is constrained to the die-holder plate 25 along the longitudinal direction X-X, but is free to slide with respect thereto in the transverse direction Y-Y inside the rectangular hole 26*a* (FIG. 7) between two opposite end-of-travel stops.

A rectangular plate 33 is fixed underneath the longitudinal extension 26 so as to keep the lining block 32 inside the hole 26*a* of the plate 25 and has a through-cavity for allowing the passage of the shaft 31, the eccentric pin 31*b* of which rotates inside the lining block 32.

The coaxial pin 31*a* at the bottom end of the shaft 31 is in turn inserted inside a bush 13*b* housed inside the hole 15*b* of the longitudinal extension of the plate 15, constraining the eccentric shaft 31 to the plate 15 with the possibility to rotate.

The preferred transmission mechanism therefore involves the lining block 32 coupled to the longitudinal radial extension 26 of the plate 25, the said longitudinal extension 26 with rectangular hole 26*a* and the holes 15*b*, 11*b* with bush of the housing body 10.

A second electric driving actuator 40 is mounted on the housing body 10 and has an output element 41 designed to be rotationally driven by the actuator 40 in both senses of rotation.

The output element 41 is coupled to the housing body 10 and to the die holder plate 25 by means of a respective transmission mechanism so that rotational movement of the output element 41 actuates the plate 25 with a rototranslational movement with respect to the housing body 10 in the transverse longitudinal plane X-Y in order to adjust a position of the female die 20 and therefore of the die axis z1 with respect to the reference axis zr of the housing body 10.

The electric driving actuator 40 may preferably comprise an electric motor 40*a* with encoder and vertical-axis gearmotor which drives the output element, in particular consisting of a vertical-axis shaft 31 with an eccentric pin 41*b* and a bottom end pin 41*a* coaxial with the axis of the shaft 41.

The shaft 41 is inserted inside a bush 12 fixed inside the hole 11*d* of the casing 11.

The coaxial pin 41*a* at the bottom end of the shaft 41 is in turn inserted inside a bush 14 housed inside the hole 15*d* of the longitudinal extension of the closing plate 15, constraining the eccentric shaft to the plate 15 with the possibility to rotate.

The second transmission mechanism is preferably a linkage and crank mechanism comprising a linkage 43, in the preferred example comprising a linkage head with a vertical-axis circular hole 43*a* arranged in an external position in the transverse direction Y-Y and designed to receive the eccentric pin 41*b* of the eccentric shaft 41 which acts as a crank of the mechanism.

The linkage 43 has a fork-shaped foot 43*b* with vertical-axis through holes.

The transverse extension 27 of the die-holder plate 25 is inserted inside the linkage foot 43*b* to which it is fastened by means of a pin 42 inserted inside the holes of the fork 43*b* and inside the hole 27*a* of the transverse extension, so that the die-holder plate 25 is forced to rotate about the pin 42 (FIGS. 8, 10).

The pin 42 is constrained to slide linearly in the transverse direction Y-Y along the two through-slots 11*c*, 15*c* respectively formed in the casing 11 and in the closing plate 15 of the housing body 10. In greater detail, the pin 42 has an upper slider designed to be inserted and slide inside the transverse through-slot 11*c* of the casing 11 and a lower slider designed to be inserted and slid inside the through-slot 15*c* of the closing plate 15.

As shown in FIG. 11, with this configuration, in order to adjust the centring of the die axis z1 with respect to the reference axis zr of the housing body, the position of the die holder plate 25 and therefore of the axis z1 of the die may be determined by the shaft 41 with cam 41*a* which is connected to the pin 42 and therefore to the plate 25 by means of the linkage 43 and is forced to rotate in the linkage 43, in the bush 13 for the coaxial pin 31*a* and in the bush 13*b* (which are fixed respectively to the closing plate 15 and to the casing 11 of the housing body).

The die holder plate 25 is in turn constrained so as to rotate about the pin 42, which pin 42 is constrained to slide linearly in the transverse direction Y-Y along the two slots 11*c*, 15*c* of the housing body 10.

The position D1 along the axis Y-Y of linear sliding pin 42 and therefore of the axis of rotation of the die holder plate 25 is determined by the linkage 43, which defines the distance of the pin 42 from the eccentric pin 41*b* of the shaft 41.

A rotation of the shaft 41 driven by the electric actuator 40 therefore causes linear sliding of the sliding pin 42 inside the transverse through-slots and therefore a rototranslation of the die holder plate 25 in the X-Y plane.

As shown in FIG. 11, the rotational component of the rototranslational movement of the plate occurs about the axis of the shaft 31 of the first output element and may therefore vary depending on the position of the said eccentric shaft 31 inside the rectangular hole 26 of the plate 25.

The distance D2 between the axis of rotation of the shaft 31 and the axis of rotation of the shaft 41 remains in fact fixed. The distance D4 between the axis of the shaft 31 and reference axis zr is also constant.

Operation of the first shaft 31 with eccentric pin 31*a* results in rotation, by means of the first transmission mechanism, of the female die holder plate 25 about the axis z42 of the pin 42 inserted in the linkage foot.

In greater detail, the shaft 31, rotating in both senses of rotation on the bush 13*b* by means of the end pin 31*a* and on the bush 13 (which are rigidly joined with the closing plate 15 and the casing 11 of the housing body, respectively), actuates the sliding block 32 with its eccentric pin 31*b* (FIG. 6), forcing it to slide inside the rectangular hole 26*a* between two end-of-travel positions.

Sliding of the block 32 rotationally drives the plate 25 about the axis z42 of the linkage foot 43*b* which is fixed in the given position by means of the second actuator 40 and the respective actuating mechanism.

The axis z42 of the pin 42 is at a constant distance D3 from the axis z1 of the die.

In other words, as shown in FIG. 1, the axis z1 of the die therefore moves along a circumference with a constant radius equal to the distance D3 between the axis z42 of the pin 42 inserted in the linkage foot and the die axis z1.

It is therefore clear how the first electric driving actuator 30 has the rotating outlet element 31 coupled to the housing body 10 and to the female die holder element 25 by means of the first transmission mechanism in such a way that the rotational movement of the output element 31 moves the female die holder element 25 in the longitudinal/transverse plane with respect to the housing body 10, in accordance with a first isometric transformation which, in the example, is a pure rotation about the axis of the linkage foot 43*b* of the second transmission mechanism.

It is also clear that the second driving actuator 40 has the second output element 41 coupled to the housing body 10 and to the die holder element 25 by means of the respective transmission mechanism 42,43 so that the rotational movement of the output element 41 moves the die holder plate 25 with respect to the housing body 10 in the longitudinal/transverse plane, in accordance with a second isometric transformation, which in the example is a rototranslation.

With the die group according to the present invention it is therefore possible to adjust precisely the position of the female die and therefore the vertical axis z1 of the die with respect to the housing 10 and therefore the vertical reference axis zr, by rotationally actuating the first output element 31 and/or the second output element 41 by means of the first or second electric actuator so as to obtain the desired isometric movement of the plate 25 in the longitudinal/transverse plane.

FIG. 11 shows the region R1 of the longitudinal/transverse plane inside which the position of the die axis z1 may be adjusted by means of the two mechanisms of the preferred example shown.

Since the reference axis zr always has a known and fixed relationship with the axis z2 of the distribution duct 52*a* of the forming head, the adjustment is able to ensure the desired alignment between die 20, distribution duct 52*a* and male element 53 as well as the maximum quality of the dispensed parison.

The solution described for adjustment of the position of the plate 25 in the longitudinal/transverse plane X-Y could be realized in a different manner. For example, the first transmission mechanism 32,33,15,15*b* could be arranged so as to act on the transverse extension 27 of the plate 25 and the second transmission mechanism 12,42,43,14 could be arranged to act the longitudinal extension 26, with a corresponding reorientation of the housing body 10 and the die holder plate 25.

It is also possible to imagine different combinations of transmission mechanisms, for example designed to operate in accordance with different rototranslation transformations, such as pure translations along the X-X and Y-Y axes, or different combinations of rotational and translational movements suitable for adjusting the position of the plate 25 and therefore of the die and die axis z1 in the plane X-Y.

In addition, the invention is not limited to radial extensions 26,27 arranged on orthogonal axes, different arrangements being possible depending on the type of isometric transformations chosen and other possible design requirements.

In particularly preferred embodiments, either one of the first radial extension 26 and the second radial extension 27 is arranged so as to project radially parallel to the longitudinal axis X-X or to the transverse axis Y-Y, while the other radial extension 27,26 may be arranged so as to project radially from the annular plate parallel to an axis oriented at an angle of between 90° e 270° with respect to said longitudinal axis X-X or transverse axis Y-Y. In other words, the radial extensions 26, 27 (and therefore the output elements of the actuators) may be arranged along orthogonal axes (X-X, Y-Y) or aligned along the same axis (X-X or Y-Y) on opposite sides of the annular plate) and therefore at an angular distance of) 180° or at a different angular distance in the plane X-Y of between 90° and 270°.

During use, the die group will be coupled to a forming head and the initial adjustment of the centring may be for example performed by means of a corresponding electronic control unit which controls operation of the actuators 30,40. The alignment may be for example checked manually (visually during the adjustment cycle) or automatically by means of suitable sensors and/or feedback devices.

FIG. 12 shows a preferred example of embodiment of a forming head 10 in which the die group 1 is mounted at the bottom end thereof where the parison is dispensed.

The head 10 is mounted on a flange 211 which, during use, is fixed in the vertical direction Z-Z, for example to a support plate (not shown) mounted on the frame of the blow-moulding machine.

The forming head 10 has a vertical axis z2 (FIG. 13) and a die group 1 for dispensing a parison through a bottom dispensing mouth 21.

A supply group 200 is connected to the die group 1 for supplying of the plastic material to be dispensed in the form of a parison through the die group 1.

The supply group 200 of the head 10 comprises (FIG. 13) an inlet 201*i* for the material to be dispensed, connected to a vertical-axis distribution chamber 51 (FIG. 14) designed to supply the duct 52*a* of the coupling bush 52 coaxially inserted inside the upper hole 18*a* of the die group 1.

The male element 53 is coaxially coupled to the coupling bush 52 and is coaxially inserted inside the distribution duct 52*a* and inside the female die 20 so as to form the bottom dispensing mouth of the parison. As can be seen more clearly in FIGS. 13 and 14, the distribution chamber 51 is displaceable integrally with the flange 211 by means of a block 321 which comprises said inlet 201*i* for the plastic material.

The die group 1 is actuated in accordance with the above description and is not described in detail; for the purposes of description it is assumed that the centring of the die 20 with respect to the axis z2 of the distribution duct 52*a* and of the male element 53 has already been performed.

The male element 53 is coaxially inserted inside the die 20, so that by varying a relative position in the vertical direction of the die 20 and male element 53 it is possible to adjust the opening of the dispensing mouth 21 and therefore the thickness of the dispensed parison.

An electric actuator 400 designed to adjust the thickness of the parison dispensed by the head 10 is supported at the top by the support flange 211 and is designed to displaceably actuate in the vertical direction Z-Z one of the male element 53 and the die 20 in order to vary the opening of the dispensing mouth, for example by means of a transmission chain 430,410 acting on the housing body 10 of the die group 1 (or on the male element 53) which transforms a rotational movement of the shaft of the actuator 400 into a translation in the vertical direction Z-Z of the housing body 10 and therefore the female die 20 (or male element), resulting in greater/lesser opening of the dispensing mouth in order to determine variations in thickness in the body of the dispensed parison and therefore of the final container.

In the preferred configuration shown, the male element 53 is fixed to the supply group 200, while the die group 1 is movable in the vertical direction with respect to the distribution chamber 51 and the male element 53 between an upper end-of-travel position (FIG. 13) corresponding to a minimum opening (closed) configuration of the mouth and a lower end-of-travel position, corresponding to a maximum opening configuration Δz (FIG. 14) of the dispensing mouth 21.

In greater detail, the coupling block 18 is rigidly connected to the bottom end of the vertical columns 410 which, passing through the flange 211, have a top end fixed to an actuating plate 421.

The actuating plate 421 is moved in the vertical direction Z-Z with respect to the flange 211 by the actuator 400, which is fixed to an upper plate 431 constrained by means of respective uprights 431 to the flange 211 with which it is therefore integral in the vertical direction.

The output shaft 405 of the actuator 400 is connected to the transmission mechanism 430 which transforms a rotational movement of the shaft 405 into a translational movement of the plate 421 in the vertical direction with respect to the plate 431 and therefore the flange 211. The mechanism 430 may be of any known type, for example of the screw/female thread type.

The translational movement of the plate 421 in the vertical direction moves the housing body 10 by means of the columns 10 with respect to the plate 411 and therefore the supply group 200 with coupling bush 52, which is fixed to the flange 211.

As can be seen in FIG. 13, in the lowered position of the die group 1, the coupling block 18 is arranged at a maximum distance 18*z* from a bottom base plane 200*z* of the supply group 200 (FIG. 14), while the coupling bush 52 ensures the sealed coupling of the die group 1 with the housing body 10. FIG. 14 shows an upper end-of-travel position of the die group 1 which, in the preferred example, is in contact with the bottom base 200*z*, resulting in the male element 53 being extracted from the die 20 by a maximum vertical distance Δz.

It will be clear to the person skilled in the art that different configurations are possible, wherein for example the housing body 10 is fixed to the distribution group 200 and the male element is coaxially actuated displaceably in the vertical direction by means of a transmission mechanism inserted inside a central coaxial cavity of the supply group 200.

It is therefore clear how with the actuator 400 for vertical translation operation of the die or the male element is able to obtain easy adjustment of the opening of the dispensing mouth and therefore of the parison thickness.

Although described in connection with a number of embodiments and a number of preferred examples of implementation of the invention, it is understood that the scope of protection of the present patent is determined solely by the claims below.

The invention claimed is:

1. A die group (1) for a forming head (10) for forming a tubular parison made of plastic material, comprising:

a female die (20), which defines an internal through-cavity (20*a*) with a vertical die axis (z1);

a female die holder element (25), rigidly connected to the female die (20);

a housing body (10) which has an upper through-hole which defines a vertical reference axis (zr) for coupling with a distribution duct (52*a*) of the forming head, said housing body (10) arranged and configured to support the female die holder element (25) allowing relative movement thereof in a longitudinal/transverse plane orthogonal to the vertical reference axis (zr) and parallel to a longitudinal direction (X-X) and to a transverse direction (Y-Y) orthogonal to each other and to the vertical reference axis (zr);

a first electric driving actuator (30), supported on the housing body (10) and configured to rotationally drive a first output element (31); the first output element (31) being coupled with the housing body (10) and with the female die holder element (25) by means of a first transmission mechanism such that the rotational movement of the output element (31) moves the female die holder element (25) in the longitudinal/transverse plane with respect to the housing body (10), in accordance with a first isometric transformation;

a second electric driving actuator (40), supported on the housing body (10) and designed to rotationally drive a second output element (41) which is coupled with the housing body (10) and with the female die holder element (25) by means of a second transmission mechanism, such that the rotational movement of the second output element (41) moves the female die holder element (25) in the longitudinal/transverse plane with respect to the housing body (10), in accordance with a second isometric transformation, whereby rotational driving of the first output element (31) and/or the second output element (41) by means of the respective first or second electric actuators (30,40) adjusts the position of the vertical die axis (z1) with respect to the vertical reference axis (zr) in the longitudinal/transverse plane, characterized in that the female die holder element is a plate (25) extending in a longitudinal/transverse plane and comprising an annular plate (25*b*) with a vertical-axis through-hole (25*a*), a first extension (26) projecting radially from the annular plate for coupling with the first output element (31) and a second extension (27) projecting radially from the annular plate for coupling with the second output element (41); wherein, preferably, the first extension projects radially in the longitudinal direction (X-X) and/or the second extension (27).

2. The die group according to claim 1, wherein the first isometric transformation and/or the second isometric transformation is a rotation or a rototranslation of the female die holder element (25) in the longitudinal/transverse plane with respect to the housing body (10).

3. The die group according to claim 2, wherein the first isometric transformation is a rotation of the female die holder element about a pin (42) and/or wherein the second isometric transformation is a rototranslation of the female die holder element (25) in the longitudinal/transverse plane, wherein preferably said pin (42) forms part of the second transmission mechanism and/or is displaced linearly with respect to the housing body when said second output element (41) is rotationally driven.

4. The die group according to claim 1, wherein at least one of the first and second transmission mechanisms is a linkage (43) and crank mechanism.

5. The die group according to claim 1, wherein said first output element and/or said second output element is an eccentric shaft (31;41) coupled to the housing body so as to rotate with respect thereto about a fixed vertical axis and with an eccentric part (31*b*;41*b*) acting on the female die holder element (25).

6. The die group according to claim 1, wherein the first radial extension (26) comprises a rectangular hole (26*a*) passing through in the vertical direction; wherein the first transmission mechanism includes a parallelepiped lining block (32) housed inside the rectangular hole (26*a*) of the first radial extension (26) of the die-holder plate (25) so as to be fixed in the direction of the short side of the rectangular hole (26*a*), but free to slide inside the rectangular hole (26*a*) in the direction of the long side of the rectangular hole (26*a*) between two opposite end-of-travel positions; and wherein an eccentric pin (31*b*) of the first output element (31) is housed inside a vertical through-hole of the parallelepiped lining block (32).

7. The die group according to claim 5, wherein the second transmission mechanism includes a linkage (43) comprising a linkage head with a vertical-axis circular hole (43*a*) inside which an eccentric pin (41*b*) of the second output element (41) rotates.

8. The die group according to claim 6, wherein the linkage (43) has a foot (43*b*) and the second radial extension (27) of the die holder plate (25) is fastened to the foot (43*b*) of the linkage by means of a pin (42) with a vertical axis (z42) such that the die holder plate (25) is forced to rotate about the vertical axis (z42) of the pin (42);

and wherein the pin (42) is coupled with the housing body (10) so as to be constrained to slide linearly, preferably in the transverse direction (Y-Y), with respect to the housing body (10) between two end-of-travel positions, when the second output element is rotationally driven.

9. The die group according to claim 1, wherein the housing body (10) comprises an upper plate, a lower plate (15) and vertical perimetral walls, which are joined together so as to define an internal volume for housing the female die holder element (25); and wherein the lower plate (15) has a through-hole (15*a*) with a vertical axis having dimensions such as to allow the coaxial insertion of the female die (20) with the possibility of movement in a longitudinal/transverse plane.

10. The die group according to claim 1, wherein an inset annular seat (15*b*) is formed on the upper surface of the lower plate (15), said annular seat surrounding the through-hole (15*a*) and housing a sliding friction ring (16) which facilitates the sliding movement of the female die holder element (25) in the longitudinal/transverse plane with respect to the housing body.

11. The die group according to claim 1, wherein the housing body (10) comprises an upper block (18) for coupling with the forming head, which is rigidly joined with the upper plate; said upper through-hole (11*a*, 18*a*) extending through the upper block (28) and the upper plate of the housing body in order to receive a male element (53) to be inserted inside the female die and to define said vertical reference axis (zr).

12. A forming head for forming a tubular parison made of plastic material for a blow-moulding machine, comprising:

a support (211), fixed during use in the vertical direction (Z-Z);

a supply group (200) for supplying the plastic material, rigidly connected to the support (211) and comprising a distribution duct (52*a*) with a vertical axis (z2);

a die group according to claim 1, wherein the housing body (10) is coupled to the supply group (200) so that the vertical reference axis (zr) of the upper through-hole (18*a*,11*a*) is coaxial with the vertical axis (z2) of the distribution duct (52*a*);

a male element (53), coaxially coupled with the distribution duct and inserted inside the upper through-hole (18*a*,11*a*) and inside the female die so as to define therewith a mouth (21) for dispensing the parison;

an electric actuator (400) designed to adjust the thickness of the parison dispensed by the forming head (10), mounted on the support (211) and designed to displaceably actuate in the vertical direction (Z-Z) one of the male element (53) and the housing body of the die group (20) so as to vary the relative position in the vertical direction (Z-Z) of the male element (53) and the female die (20) in order to adjust the opening of the dispensing mouth.

13. The forming head according to claim 12, wherein the male element (53) is fixed to the supply group (200) and the die group (1) is movable in the vertical direction with respect to the distribution chamber (51) and the male element (53) between an upper end-of-travel position corresponding to a minimum opening configuration of the dispensing mouth and a lower end-of-travel position, corresponding to a maximum opening configuration (Δz) of the dispensing mouth (21).

14. The forming head according to claim 12, wherein the electric actuator (400) for adjusting the thickness of the parison is connected by means of a transmission chain (430,410) to the housing body (10) of the die group (1) or to the male element (53), said transmission chain being configured to transform a rotational movement of a shaft of the actuator (400) into a displacement in the vertical direction (Z-Z) of the housing body (10) and therefore of the female die (20) or of the male element (53) with respect to the support (211).

* * * * *